Nov. 29, 1927.
T. F. BANNON
1,651,176
PORTABLE SHEET METAL SHEARS
Filed April 24, 1926
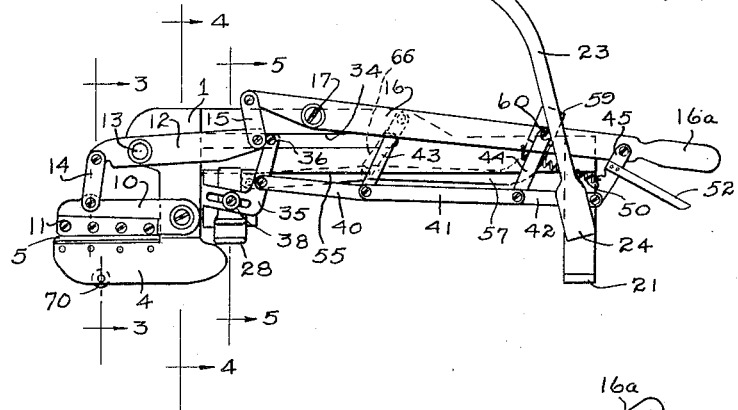
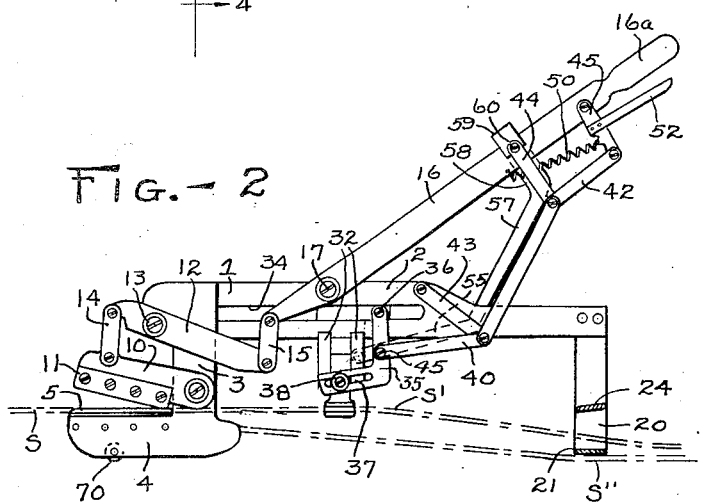
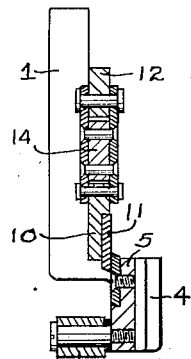
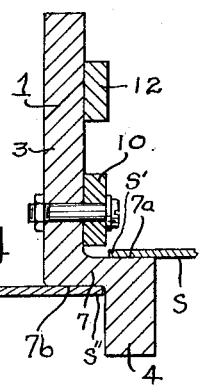
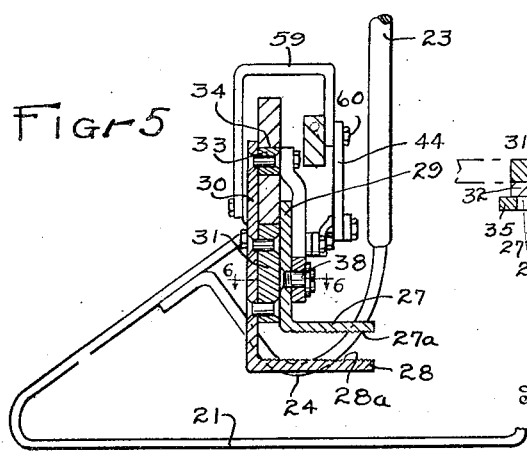
Inventor
Thomas F. Bannon,
By Bates, Macklin, Gobnet & Teare
Attorneys Patented Nov. 29, 1927.

1,651,176

UNITED STATES PATENT OFFICE.

THOMAS F. BANNON, OF CLEVELAND, OHIO, ASSIGNOR OF ONE-HALF TO SAMUEL T. WILLIS, OF CLEVELAND, OHIO.

PORTABLE SHEET-METAL SHEARS.

Application filed April 24, 1926. Serial No. 104,310.

This invention relates to metal sheet cutting implements. The primary object is to provide a comparatively simple and efficient portable machine for shearing sheet stock. A further object is to provide a novel means operable in conjunction with the shearing mechanism for gripping and feeding the sheet when the shear blades open. Further objects include the provision of a machine of this character which shall offset the sheared edges of such stock and operate on one of said offset edges for feeding the sheet, step by step as it is sheared.

Other objects and features of the invention will become apparent from the further description which relates to the accompanying drawing wherein I have shown my preferred form. The essential characteristics will be summarized in the claims.

In the drawing Fig. 1 is a side elevation of my preferred mechanism with the parts shown in one position. Fig. 2 is a similar elevation with the parts shown in another position. Fig. 3 is a transverse section through the shearing blades and associated parts, taken along the line 3—3 on Fig. 1. Figs. 4 and 5 are similar sections taken along the lines 4—4 and 5—5 on Fig. 1. Fig. 6 is a fragmentary sectional view of the gripping means, as indicated by the line 6—6 in Fig. 5.

In the use of portable metal shears such as now used it has been found difficult to provide an efficient sheet feeding means. Moreover in such devices, it is difficult to make the shears travel along a straight line without considerable skill and care on the part of the operator. The problem of providing a portable shears which will eliminate these difficulties and yet be comparatively simple to construct and light enough so that it may be carried from place to place has been overcome by my invention as will hereinafter appear.

In carrying out my invention I employ a frame substantially in a single piece which supports at one end a pair of relatively movable shear members operated by multiplying levers pivoted to the frame. The frame is so constructed that one of the cut edges rides over a portion of the frame adjacent to the shears and the opposite cut edge rides under the same portion of the frame to offset these cut edges. Operating in a suitable slide is a gripping device arranged to follow the slit, and as shown, is arranged to be conveniently operated at will to grip or release the sheet.

Referring in detail to the drawing and indicating the various parts by suitable characters, 1 designates the frame in general which may be made in one piece or several pieces as desired and which has a horizontally extending portion 2, and a downwardly extending portion 3, at the front end thereof. At the lower end of the portion 3, is a forwardly extending portion 4, arranged to rigidly support one of the shear blades which is designated 5. The frame portions 3 and 4 are connected by a transversally extending portion 7, as shown particularly in Fig. 4, the purpose of which will be later more fully set out.

Pivotally mounted on the depending portion 3 of the frame I have shown an arm 10 which carries a shear blade 11 in position to slide across the shear blade 5 in the usual manner. The operating means for the arm 10 comprises, as shown, a lever 12 pivoted at 13 near the top of the frame and connected to the member 10 by a suitable link 14, a suitable construction for such link being shown best in Fig. 3. Connected to the rear end of the lever 12 by a link 15 is a manually operable lever 16 shown as pivoted at 17 to the horizontally extending portion of the frame. This lever is shown as suitably formed at 16ª, to provide a handle.

At the rear end of the frame I have shown a supporting leg, comprising a depending strap 20, which may be made in the form shown in Fig. 5 with a transversally extending foot portion 21. In practice this leg member may be shortened if desired allowing the sheared stock to pass from the gripper underneath the foot portion of the leg without appreciable bending. Such construction would be desirable in cutting comparatively heavy stock or in case the slit in the stock is to be a curved one. The leg 20, carries a handle bar 23 for guiding the frame and to assist in moving the same relative to the stock to be cut. This handle is shown as being downwardly looped as at 24 to provide clearance for the movement of the lever 16. By reason of this handle 23 the operator may cause the shears to follow a curved line simply by bearing to the right or left on the handle as required.

With reference to Fig. 4 it will be seen that when the sheet indicated at S is slit by the shear blades, one side of the sheared sheet S' rides up over the top surface 7ª of the connecting portion 7 and the other side S'' rides under the portion 7 along the surface 7ᵇ. One of these edges may be therefore easily grasped by the feeding means close to the shear blades without interference with the other edge. The thus raised portion of the sheet S' may lie on top of the foot 21 while the portion S'' may underlie this foot as shown in Fig. 2, or both edges may pass beneath the foot depending on the gauge of stock to be cut and on the length of the leg.

In Figs. 1, 2 and 5 I have shown the construction whereby the sheared edge S' may be gripped to feed the sheet relative to the frame. This arrangement may consist of jaws 27 and 28 slidably mounted on the frame, one of the jaws being also independently slidable to grip and release the sheet. The jaws are both shown as serrated as at 27ª and 28ª respectively. Each jaw is made as shown of a single strip, bent at right angles and extending upwardly at opposite sides of the frame at 29 and 30, as best shown in Fig. 5. The portion 30 of the jaw 28 has riveted thereto a block 31 which slides along the under edge of the frame. At its upper end the portion 30 has a similar block 33 shown as riveted thereto, and which slidingly fits a slot 34 extending along the horizontally disposed portion of the frame. This portion 33 of the slide supports as well as guides the jaw 28. The upward extension 29 of the jaw 27 may be dovetailed to the block 31 by strips 32 secured in any manner to the block for the purpose of opening and closing the jaws. To control this opening and closing I have provided means including a bent arm 35 shown as pivoted at one end at 36 to the block 33 and which has in its lower portion a slot 37 engaging a pin 38 rigid with the jaw member 29. It will be easily seen that as this bent arm is rocked about its pivot the jaw 27, will be moved up and down. To thus rock the arm I have shown a linkage comprising separate connected links 40, 41 and 42, one being connected to the arm at 45 the links being otherwise supported by downwardly extending arms 43, 44 and 45, the first of which is pivoted to the frame, the latter two being pivoted on the lever 16. The arm 45 is shown as drawn forwardly by a spring 50 fastened to the lever 16 at one end which, it will be seen, normally holds the jaws in open position. In order to conveniently operate the linkage to cause the jaws to bite the edge of the sheet I show an arm 52 extending from the arm 45, adjacent the portion 16ª of the main operating lever.

This particular arrangement has been adopted in order that the controlling means for the gripper jaws may be positioned on the lever for convenient operation, yet be operated independently of the throw of the lever. I do not, however, consider such an arrangement essential.

The main slide as shown is connected to the lever by independent means, whereby the gripper may reciprocate along the edge of the sheet when the shears are opened and closed. This arrangement comprises linkage also connected to the main operative lever, on the opposite side of the frame from the jaw control linkage and as shown comprises a link 65 secured to the block 31 at one end and supported at the other by a depending arm 66 as shown in dotted lines in Fig. 1. The link 55 is connected to a link 57 which as shown rises upwardly, over the upper edge of the lever 16 as at 59 and is connected with this lever by a bolt 60 which also serves to support the arm 44. Thus it will be seen that when the lever 16 is raised and lowered, the slide is caused to move away from and toward the shears respectively, while by reason of the arm 52 and the linkage connected therewith the jaws may be relatively moved to grip or release the sheet as desired independently of the movement of the slide.

To begin cutting a sheet the lever 16 is operated to cut a slit in the sheet about twice the length of the shear blades, with the sheared edges separated as above explained. The raised edge S' is then in position to be engaged by the gripper jaws. Thereafter as the handle 16 is moved upwardly the operator grips the arm 52 causing the jaws to come together on the sheet, and to either draw the sheet into the machine or, if the sheet is of relatively large size, to draw the sheet along and cause the shear blades to move along the slit. Then when the lever 16 is again lowered, the operator releases the arm 52, while the jaws ride idly along the sheared edge S' to a new gripping position.

It will be seen from the above description, that I have provided a comparatively simple machine, which will operate efficiently, to cut and feed sheets in the manner described. I have found that with a machine built in the proportions shown and with a longitudinal dimension of about three feet I am enabled to cut steel sheets of a thickness as great as three sixteenths of an inch.

I claim:

1. A portable sheet cutting mechanism including a pair of shears, and an associated frame, means for operating the shears to slit the sheet, a gripper arranged to be moved along the slit by said means in two directions, and means for causing the gripper to engage the sheet to feed it relative to the frame during one of said movements.

2. Portable cutting mechanism for sheet stock comprising coacting shear members, means for causing the same to coact to slit the sheet, means for offsetting the thus severed edges of the sheet, and means interposed between the offset edges for feeding the stock relative to the shear members arranged to grip the stock at one of said offset edges.

3. Portable mechanism for cutting and feeding sheet stock comprising a pair of shears, a supporting frame therefor, manually operable means for causing the shears to coact to slit the sheet, means for offsetting the thus severed edges and gripping means operating on one of the offset edges, movable relative to the frame and having a connection with said manually operable means for feeding the sheet relative to the frame when the shears are opened by said first named means.

4. In a portable machine for shearing and feeding sheet stock, a pair of shears, a supporting frame therefor, manually operated mechanism for causing the shears to coact, said mechanism including a lever, and gripping means movable relative to the frame and operated by said lever for feeding the sheet relative to the frame along the line of shear when the shears are opened, said gripping means comprising a slide member and a member movable transversely of the slide to engage an edge of the sheared sheet along the slit.

5. Portable shearing mechanism for sheet stock comprising a frame adapted to move along the stock following the cutting operation, relatively movable shear members carried by said frame, linkage having a member pivoted to the frame for operating one of the shear members, means guided by the frame in a substantially rectilinear path for gripping the edge of the sheet, a connection between said linkage and the gripper and means for causing the gripper to open and close on the sheet.

6. Shearing mechanism for sheets comprising a frame having a portion thereof adapted to extend below the sheet, a shear member mounted on said portion, the frame having a portion extending above the sheet, a cooperating shear member carried thereby, and gripping means for feeding the sheet relative to the frame along the line of shear.

7. In a sheet cutting mechanism, a frame, a pair of shear members carried thereby arranged to cut a sheet, gripping means slidable on the frame and operating adjacent the shear members to grasp a cut edge of the sheet, linkage for operating the shear members, a connection with the linkage for moving the gripper in the direction of the slit cut in the sheet, and means for opening and closing the gripper, as the sheet is cut, to feed the same relative to the frame.

8. In a device of the character described, a frame having cooperating shear members one being movably mounted, a lever pivoted to the frame and having a connection with the movable shear member, sheet gripping means arranged to grasp one of the sheared edges of the sheet and move the same relative to the frame when the shears are opened, and means carried by the lever and having a connection with the gripper whereby the sheet may be gripped and fed by the operator's hand in position to move the lever.

9. Mechanism for cutting sheet stock comprising a portable frame, shear members, one movably mounted on, and the other rigid with the frame, a lever pivoted to the frame and having an operating connection with the movably mounted shear member, a slidable gripping device mounted on the frame, said device comprising jaws, one of the jaws being movable on the slide at right angles to the movement of the slide, and a system of links and levers connected with the movable jaw including a pivoted arm mounted on the lever in position to be engaged by the operator's hand when operating such lever.

10. Portable cutting mechanism comprising a frame, shear members carried thereby, one adapted to be positioned above the sheet to be cut, the other below the sheet, means for separating the adjacent severed edges of the cut sheet and gripping means movable substantially parallel to the sheet along the line of shear and adapted to grip one of the thus separated edges, and means for operating the shears having connection with said gripping means.

11. A device of the character described, comprising a frame, shear members, mounted on the frame, a lever pivoted to the frame and having a connection therewith, a gripper for sheets to be sheared for moving such sheets relative to the shears along the line of shear, and means connecting the gripper to the lever, whereby, when the lever is moved to open the shears the gripper is drawn away from the shears and caused to grip an edge of the sheet.

12. In a sheet cutting machine comprising a frame adapted to rest on the sheet, a pair of shear members, one rigid with the frame and one pivoted thereto, means for gripping one of the edges of the sheared sheet to move the same relative to the frame, two levers pivoted on the frame, one having a connection with the pivoted shear and the other being arranged to be manually moved, and a connection between one of said levers and the gripping means, whereby the gripping means moves conjointly with the levers, and a connection with the manually operated lever for causing the gripping means to grip or release the sheet as desired.

13. In a mechanism of the kind described, comprising a pair of shears, a supporting frame therefor, operating means for the shears, means for moving a sheet to be cut relative to the frame, said latter means comprising gripper jaws arranged to be moved by the shear operating means toward the shears when said shears are cutting and away from the same when opening, and means whereby the jaws may be closed during the latter movement.

14. A portable sheet cutting mechanism comprising a frame adapted to rest on the sheet to be cut, a pair of shear members mounted at the front end of the frame, operating means therefor including a lever extending rearwardly of the frame, a support for the rear end of the frame adapted to rest on the sheet to be cut, means whereby the operator may guide the frame with one hand and operate the lever with the other, and gripping means connected with the lever and arranged to follow a sheared edge of the sheet for feeding the sheet relative to the frame.

15. A portable sheet cutting mechanism comprising a frame adapted to rest on the sheet to be cut, a pair of shear members mounted at the front end of the frame, operating means therefor, including a lever extending rearwardly of the frame, a support for the rear end of the frame adapted to rest on the sheet to be cut and a handle extending upwardly from the rear end of the frame adjacent to the lever, whereby the operator may guide the frame with one hand and operate the lever with the other, and gripping means connected with the lever for feeding the sheet relative to the frame.

16. In a portable metal shears, relatively movable shear blades, linkage for operating the same, means following the sheared edge of the stock and connected to the linkage for feeding such stock relative to the shear blades.

17. A portable shearing mechanism for metal sheets comprising shear members, operating means therefor, a frame, and means movable relative to the frame and following a sheared edge of the stock and operably connected to said operating means for feeding the stock when the shear members are inactive.

18. A portable shearing mechanism for metal sheets comprising shear members, operating means therefor, a frame, gripping jaws, one being movable relative to the frame in two directions and arranged to follow a sheared edge of the stock, one of the jaws being operably connected to said means for moving the jaws in one direction to feed the sheet and the other having a separate connection therewith for causing such other relative movement to grip the sheet.

In testimony whereof, I hereunto affix my signature.

THOMAS F. BANNON.